United States Patent [19]

Gibbons et al.

[11] Patent Number: 4,929,476

[45] Date of Patent: * May 29, 1990

[54] OXYGEN IMPERMEABLE LEAK FREE CONTAINER

[75] Inventors: Charles E. Gibbons; Gerald A. Marano; James M. Kittrell; Allan A. Whillock; Robert L. Lanham, all of Mobile; Donald Evans, South Mobile, all of Ala.

[73] Assignee: International Paper Company, Purchase, N.Y.

[*] Notice: The portion of the term of this patent subsequent to Feb. 5, 2090 has been disclaimed.

[21] Appl. No.: 354,570

[22] Filed: May 22, 1989

[51] Int. Cl.$^5$ ............ B65D 5/56; B32B 27/10
[52] U.S. Cl. .................. 428/34.2; 428/35.9; 428/36.7; 428/349; 428/461; 428/475.8; 428/483; 428/513; 428/516; 428/518; 428/520
[58] Field of Search ............ 428/34.2, 35.9, 36.7, 428/349, 461, 475.8, 483, 513, 516, 518, 520

[56] References Cited

U.S. PATENT DOCUMENTS

| | | | |
|---|---|---|---|
| 3,972,467 | 8/1976 | Whillock et al. | 428/213 |
| 4,513,036 | 4/1985 | Thompson et al. | 428/34.2 |
| 4,590,126 | 5/1986 | Anderson | 428/349 |
| 4,698,246 | 10/1987 | Gibbons et al. | 428/34.2 |
| 4,701,360 | 10/1987 | Gibbons et al. | 428/34.2 |
| 4,777,088 | 10/1988 | Thompson et al. | 428/34.2 |
| 4,789,575 | 12/1988 | Gibbons et al. | 428/34.2 |

Primary Examiner—James Seidleck
Attorney, Agent, or Firm—Walt T. Zielinski; Stewart L. Gitler

[57] ABSTRACT

The present invention relates to an improved container for food and non-food products. The container utilizes a novel paperboard barrier laminate structure which maintains an isolated gas environment in the container. The laminate makes use of high strength, heat-resistant and caulking polymer layers which prevent pinholes, cuts, or cracking of the barrier layers during blank conversion, package formation, and package distribution. In addition, the novel polymer resin layers act to caulk the seams and channels present in the carton providing a sealed leak free container.

27 Claims, 1 Drawing Sheet

OXYGEN IMPERMEABLE LEAK FREE CONTAINER

BACKGROUND OF THE INVENTION

The invention relates to a heat-sealable barrier laminate structure which produces an oxygen impermeable, leak free container. More particularly, this invention relates to barrier laminate structures which are comprised of specific high strength polymer resin layers which effectively prevent heat activation pinholes, cuts or cracking of oxygen barrier layers caused during scoring and especially during folding and heat sealing of the laminate in package formation.

The invention as disclosed and claimed herein is closely related to pending application Ser. Nos. 191,987; 191,988 now U.S. Pat. No. 4,888,222; Ser. No. 191,989 now U.S. Pat. No. 4,880,701; Ser. No. 191,992 and 191,337 now U.S. Pat. No. 4,859,513, all owned by the Assignee. Also, application Ser. Nos. 354,591 and 354,571 two additional applications have been concurrently filed and are related. Thirdly, structures for paperboard containers using heat-sealable polymer resins and containing various oxygen barrier materials are disclosed in U.S. Pat. Nos. 3,972,467; 4,698,246; 4,701,360; 4,789,575 and 4,806,399, all owned by the Assignee.

Heat-sealable low density polyethylenes are well known to be components of current paperboard food and/or non-food packages which provide little barrier to the transmission of oxygen. Pinholes, cuts, score line cracks or channels, existent in conventional packaging and cartons, create additional leakage sites. It is well known that impermeable materials such as aluminum foil, polar brittle materials such as: polyacrylonitriles, polyvinylidenechlorides, polyvinyl chlorides, etc., provide varying degrees of barrier to the transfer of oxygen. However, all these materials lack the requisite strength at high rates of deformation, namely stress cracking resistance during scoring, package formation and distribution abuse to provide a resultant oxygen impermeable and airtight structure. In addition, leakage through the uncaulked channels of the carton in the top, bottom and side seam have likewise resulted in poor whole carton oxygen barrier properties.

The existing commercial structures for a paperboard carton for liquid and solid, food and non-food, products have utilized an easily heat-sealable barrier laminate composed of a paperboard substrate and a foil oxygen barrier layer, both being sandwiched between two thick layers of low density polyethylene (LDPE). The LDPE is a relatively inexpensive heat-sealable moisture barrier material. The conventional structure falters in that the foil layer which acts as the barrier to the transmission of oxygen in and out of the carton cracks during blank conversion, carton formation, and package distribution stages.

Bending and folding occurring during the formation of a gable "type" top, flat "type" top, or other folded, heat-sealed top closure, and a fin-sealed, or other conventional folded bottom puts excessive amounts of local stress on the thin foil and/or other oxygen barrier layer and, as typically results, cracks and pinholes appear.

To date, there have been no economically attractive commercially available paperboard packages which consistently approach the oxygen impermeability of glass or metal containers. The object of the present invention is to produce an oxygen impermeable, leak free container and/or laminate structure such as a paperboard based package or carton that prevents the transmission of gases therethrough, and in addition, prevents the escape of flavor components or the ingress of contaminates. A further object of the present invention is to produce such a package that is economical on a per-package cost basis, is fundamentally compatible with existing converting machinery and can be formed, filled and sealed at economically high speeds using conventional packaging machine temperatures, pressures and dwell times.

Another object of the present invention is to provide this oxygen impermeable package in a variety of applications including four-ounce to 128-ounce containers, or larger, as required by the packager.

A further object of this invention is to incorporate a functional polymer layer which exhibits high strength, abuse resistance and toughness during converting and carton forming in combination with aluminum foil or other oxygen barrier layers and paper, paperboard or other mechanically stable structural material such that the high-strength layer reduces the stresses incurred by the barrier layers during blank conversion, package formation, and distribution. Additionally, should a penetration of the barrier layer or layers occur, the high-strength layer serves to maintain package integrity at the failure site. The high-strength, heat-resistant layer effectively prevents heat activation pinholes through the product contact layer, even when non-foil barrier layers are used.

SUMMARY OF THE INVENTION

A preferred embodiment of the invention reveals an oxygen impermeable leak free barrier laminate, side-seamed blank and/or container providing a total barrier to the loss of essential food flavor oils or non-food components over an extended product shelf-life as well as an absolute barrier to the transmission of oxygen during the same extended shelf-life period. A preferred embodiment of the laminate structure comprises, from the outer surface to the inner surface, contacting the essential oils, flavors and/or components of food or non-food products: an exterior layer of a low density polyethylene, a mechanically stable structural substrate, such as an unbleached or bleached paper or paperboard material, a corrugated board, a stiff polymer resin material such as high density polyethylene or polypropylene, or multi-ply combinations thereof, a first layer of a caulking polymer resin such as an ionomer type resin (Surlyn ®1652), an oxygen barrier material layer such as an aluminum foil layer, a sandwich interior layer of an abuse-resistant polymer such as a polyamide type polymer (nylon 6) surrounded by two additional caulking polymer resin layers such as an ionomer type resin (Surlyn ®1652), and a layer of low density polyethylene in contact with the food or non-food product rendering the laminate structure heat-sealable.

The cartons, side-seamed blanks, or containers constructed of the laminate of the present invention enable significant containment of gases in the container as well as preventing any migration of oxygen or contaminants into the package. The present invention has produced a suitable container which has the ultimate barrier properties. It utilizes a laminate which can be heat-sealed easily with its exterior and interior layers being like, non-polar constituents. During the heat-seal processes, the scoring processes, the side-seaming processes, and the folding, forming and filling steps, the particular caulking polymer resins, namely ionomer type resins, ethylene acrylic acid copolymers, ethylene methacrylic acid copolymers, ethylene vinyl acetate copolymers, ethylene methylacrylate copolymers, polyethylene based grafted copolymers and the like, with melt indexes which allow them to flow during the heat-sealing processes (temperatures ranging from 250° F. to 500° F.). The particular selected resins act as a caulking agent to fill the channels produced during formation of the gable, or other type flat top, the fin-sealed, or other conventional type bottom and the skived side seam. Consequently, each of those gap areas is caulked to prevent the leakage of oxygen therethrough. In addition, the selection of the particular abuse-resistant polymer, namely polyamide type polymers, polyester type polymers and ethylene vinyl alcohol copolymers or the like acts to prevent any type of significant deformation damage to the foil or other oxygen barrier layer which would result in a crack or pinhole allowing for the seepage of oxygen therethrough.

The preferred package structures formed from the preferred novel laminates of the present invention not only exhibit these novel oxygen impermeable and/or other high barrier properties, but the novel laminate structures are produced using conventional extrusion and/or coextrusion coating and/or lamination equipment.

The novel laminate structure and materials selected therefor, namely the particular caulking polymer resins and abuse-resistant polymer resins contemplated by the present invention, coupled with oxygen impermeable or high oxygen barrier materials, in various combinations, can be utilized in a variety of food or non-food packaging applications.

In one application, the preferred laminate structure is produced using conventional coextrusion coating equipment.

Secondly, this laminate is printed and forwarded through scoring dies and cutting dies to create flat blanks.

Thirdly, these flat blanks are skived and folded and side-seamed to create the side-seamed blanks. During the heat-sealing step of the side-seam operation, the resins which have been selected for their particular melt flow characteristics, caulk and seal along the seam. Resins which have melt flow indexes ranging from 4.5 to 14.0 are preferred. These side-seamed blanks are then forwarded to the particular customer for further assemblage.

Fourth, these side-seamed blanks are magazine fed into a machine wherein they are opened and placed on a mandrel, wherein sealing of the bottom takes place.

Typically, the bottom folding and sealing is where most of the damage to the interior thin barrier foil layer occurs in conventional cartons. Utilization of a particular strong polymer resin, comprising an abuse-resistant polymer, such as a polyamide type polymer, prevents cracking of the foil layer during the bottom sealing process. The bottom is fully heat-sealed into a flat configuration at which time caulking polymer resins, such as ionomer resins, flow in a caulking manner to seal the bottom. The container or package is then forwarded to the filling step. Next, the top is "prebroken" and filled with the particular product and then top-sealed. Again, much damage is done to the foil or other barrier layer during this top-sealing process of conventional cartons. The utilization of the novel abuse-resistant and caulking polymer resin constituents in the barrier laminate acts to prevent any damage to the foil or non-foil barrier layer and produce a top closure which has been caulked to doubly prevent any transport of oxygen.

The novel barrier laminate produced by the present invention not only exhibits excellent oxygen barrier properties and can be easily constructed, but also meets FDA approval for use in food packaging. The resins heat seal at low temperatures (250° F. to 500° F.) and the structures can be converted and cut on conventional machinery.

Thus, until the advent of the present invention, no suitable oxygen impermeable, leak free containers or packages have been developed which retain the advantages of using mechanically stable structural substrates such as paperboard or the like as the base material and FDA approved heat-sealable barrier layers which are economical and can be produced using conventional coextrusion coating equipment.

The present invention described herein is particularly useful as a coated paperboard structure employed in the packaging of food and non-food products. These types of containers make use of a heat-seal for seaming and closing, and are utilized in the formation of folding boxes, square rectangular cartons or containers, or even cylindrical tubes.

In addition, the novel combinations of caulking polymer resins, abuse-resistant polymers and oxygen impermeable and/or high oxygen barrier materials have other applications as well.

Namely, the combination of high oxygen barrier materials such as ethylene vinyl alcohol copolymers or other brittle oxygen barrier materials coupled with abuse-resistant type polymer resins such as polyamide type polymers or the like, have applications in combination with almost any mechanically stable structural substrate. Particularly, multilayer blow-molded containers incorporating abuse-resistant polymer resins in combination with high oxygen barrier materials is one of the novel applications of this invention.

One specific example of such an application is the utilization of ethylene vinyl alcohol copolymer in combination with a polyamide type polymer mounted on a high density polyethylene structural substrate. The polyamide type polymer acts to protect the brittle ethylene vinyl alcohol copolymer oxygen barrier layer from abuse during shipping and transport of the overall container structure.

DETAILED DESCRIPTION OF THE INVENTION

Figure 1:
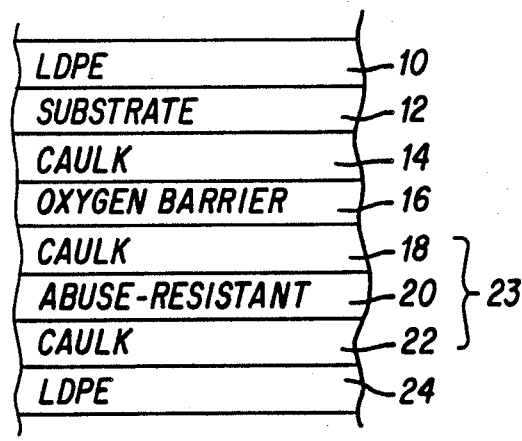
FIG. 1 is a cross-sectional elevation of the preferred embodiment of the laminate of the present invention.

The preferred embodiment of the invention is for an hermetic, oxygen impermeable leak free and/or high oxygen barrier leak free package incorporating a laminate structure as disclosed in FIG. 1. All weights are expressed in pounds per 3,000 square feet. Disclosed is a mechanically stable structural substrate 12 which is most suitably high grade paperboard stock, for example, 100–300 lbs. or higher sized carton board, to which is applied on one side a coating of a low density polyethylene polymer 10 in a coating weight of about 12.0 to 30.0 lbs. Layer 10 is the "gloss" layer which contacts the outer atmosphere. An extrusion coating grade LDPE having a melt flow index ranging from 4.0 to 7.0 is suitable for use herein. On the underside or interior portion of the paperboard substrate 12 is coated thereon a layer of a caulking polymer resin, 14, such as an ionomer type resin (Surlyn ®1652), in a coating weight of about 8.0 to 20.0 lbs., and coated on the interior of the caulk is an absolute oxygen impermeable material or a high oxygen barrier material, such as a 0.000275–0.0005 inch layer of aluminum foil having a coating weight of about 12 lbs., 16. Coated onto the foil is a sandwich layer, 23, of an abuse-resistant polymer resin such as a polyamide type polymer (nylon 6), 20, in a coating weight of about 3.0 to 10.0 lbs., sandwiched between two caulking polymer resin layers, 18 and 22, such as an ionomer type resin (Surlyn ®1652), in coating weights of about 2 to 6 lbs., and lastly coated onto the sandwich layer, 23, is a second layer of low density polyethylene polymer 24, in a coating weight of about 12.0 to 30.0 lbs. rendering the entire laminate structure heat sealable on conventional heat-seal equipment at conventional heat-seal temperatures (250° F. to 500° F.).

Figure 2:
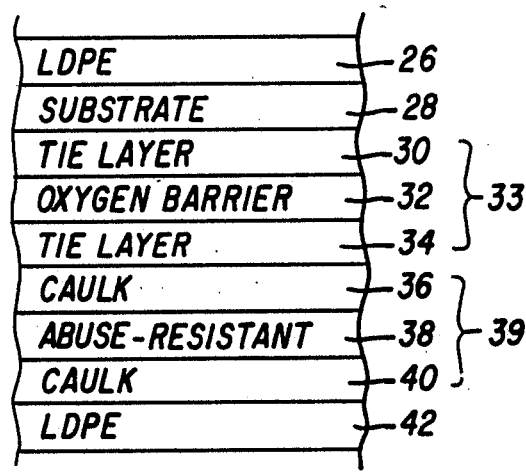
FIG. 2 is a cross-sectional elevation of an alternate embodiment of the laminate of the present invention.

Referring to FIG. 2, an alternate preferred embodiment of the laminate of the present invention is shown. The embodiment adds tie layers around the oxygen barrier material layer to facilitate better adhesion in the structure. In this alternate preferred embodiment, the mechanically stable structural substrate 28, such as a paperboard substrate, having a weight of 100–300 lbs. or higher for a half pint or smaller, pint, quart, half gallon, gallon and multi-layer structures, has extrusion coated on its external surface a 12.0 to 30.0 lb. layer of a low density polyethylene polymer 26. On the internal surface of the mechanically stable structural substrate 28, is applied a first sandwich layer 33, of an oxygen barrier material such as an ethylene vinyl alcohol copolymer, having a coating weight of about 8.0 to 20.0 lbs., 32, sandwiched between two tie layers 30 and 34, such as a Plexar ®175, having coating weights of about 2.0 to 6.0 lbs. each. Coated onto the first sandwich layer 33 is a second sandwich layer 39 comprising an abuse-resistant polymer resin, such as a polyamide-type polymer (nylon 6), 38, having a coating weight of about 3.0 to 10.0 lbs. sandwiched between two caulking polymer resin layers, 36 and 40, having coating weights of about 2.0 to 6.0 lbs. each. Finally, coated thereon, is a 12.0 to 30.0 lb. layer of a low density polyethylene polymer 42 which in combination with layer 26 renders the entire laminate structure heat-sealable.

Figure 3:
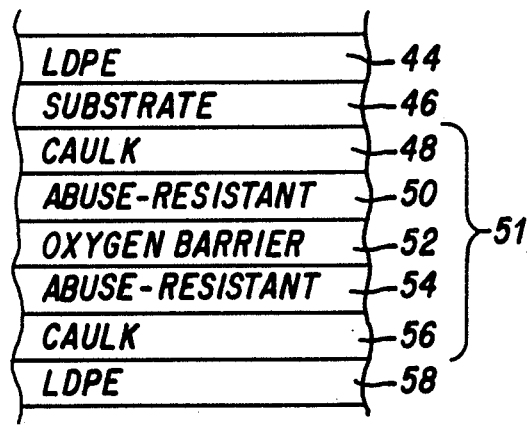
FIG. 3 is a cross-sectional elevation of an alternate embodiment of the laminate of the present invention.

FIG. 3 is another preferred embodiment of the present invention. A mechanically stable structural substrate such as a paperboard substrate having a weight of 100–300 lbs., or higher, 46, is coated with a 12.0 to 30.0 lb. layer of a low density polyethylene polymer on its exterior 44. On the interior layer of the substrate 46 is coated a five-layer sandwich, 51, having the following laminate structure: A first 2.0 to 6.0 lb. layer of a caulking resin material, such as an ionomer resin (Surlyn ®1652), 48, a first 3.0 to 10.0 lb. layer of an abuse-resistant polymer resin, 50, such as a polyamide-type polymer (nylon 6), an oxygen barrier material layer, 52, such as an ethylene vinyl alcohol copolymer, having a coating weight of about 8.0 to 20.0 lbs., a second 3.0 to 10.0 lb. abuse-resistant polymer resin layer, 54, such as a polyamide type polymer (nylon6), and a second 2.0 to 6.0 lb. caulking polymer resin layer such as an ionomer resin (Surlyn ®1562). Finally coated thereon is a second 12.0 to 30.0 lb. layer of a low density polyethylene polymer, 58, rendering the entire laminate structure heat-sealable on conventional heat-seal equipment at conventional heat-seal temperatures.

Although specific coating techniques have been described, any appropriate technique for applying the layers onto the mechanically stable structural substrate can be suitably employed, such as extrusion coating, coextrusion coating, extrusion lamination, coextrusion lamination and/or adhesive lamination of single layer and/or multilayer films to the mechanically stable structural substrate to achieve the stated inventions of this patent. The unique effect provided by the oxygen impermeable, leak free packages made from the laminate of the present invention is clearly demonstrated by the following Examples outlined in Table I. The preferred embodiment of the present invention is listed as the "International Paper oxygen impermeable halfgallon" and it utilizes as its mechanically stable structural substrate a 282 lb. layer of paperboard. The preferred structure is compared in Table I to a variety of commercial paperboard based and non-paperboard based containers currently available in the market place and recommended for extended shelf-life applications.

TABLE I

| | Average Whole Container Oxygen Transmission Rates (OTR) | |
|---|---|---|
| Container | Avg., CC $O_2$/Pkg./Day (75° F., 50% RH, in Air) | OTR (CC/$M^2$/Day) To Fill - Volume (ml) Ratio* |
| INTERNATIONAL PAPER (OXYGEN IMPERMEABLE HALF-GALLON) | 0.000 | 0.000 |
| TOPPAN, EP-PAK (1500 ml) WITH PLASTIC FITMENT | 0.005 | 0.004 |
| INTERNATIONAL PAPER ASEPTIC (250 ml.) | 0.016 | 0.2 |
| TETRA BRIK-PAK (250 ml.) | 0.013 | 0.2 |
| CAPRI-SUN POUCH (200 ml.) | 0.01 | 0.3 |
| TREESWEET COMPOSITE FIBER CAN (1360 ml.) | 0.29 | 0.4 |
| CONOFFAST CUP (250 ml.) | 0.022 | 0.4 |
| INTERNATIONAL PAPER HOT FILL (2000 ml.) | 1.11 | 0.5 |
| GALLON HDPE (BLOW MOLDED BOTTLE) | 2.75 | 0.5 |
| HALF-GALLON HDPE | 1.98 | 1.1 |

TABLE I-continued

| Average Whole Container Oxygen Transmission Rates (OTR) | | |
|---|---|---|
| Container | Avg., CC $O_2$/Pkg./Day (75° F., 50% RH, in Air) | OTR (CC/$M^2$/Day) To Fill - Volume (ml) Ratio* |
| (BLOW MOLDED BOTTLE) HYPAPAK (700 ml.) | 0.52 | 1.7 |
| HAWAIAN PUNCH COMPOSITE CAN (236 ml.) | 0.09 | 2.0 |
| COMBIBLOCK (250 ml.) | 0.21 | 3.2 |
| JUICE BOWL COMPOSITE CAN (355 ml.) | 0.34 | 4.1 |

*All numbers should be multiplied by $10^{-2}$

It can be seen that the container prepared from a laminate of the present invention provides a complete hermetic barrier to the transport of oxygen.

The specially selected abuse-resistant polymer constituents such as the polyamide type polymers which make up the container are resilient enough to prevent any type of cutting, pinholing, or other damage caused during the converting, carton formation and distribution steps. In addition, the container utilizes ionomer type resins as caulking material for the channels and seams.

The mechanically stable structural substrate may consist of an unbleached or bleached paper or paperboard material, a corrugated type board material, a stiff polymer resin material such as high density polyethylene or polypropylene, and/or multi-ply combinations thereof.

The barrier layer may consist of an aluminum foil, an ethylene vinyl alcohol copolymer, a polyvinyl alcohol polymer, a polyethylene terephthalate, a polybutylene terephthalate, a glycol-modified polyethylene terephthalate, an acid-modified polyethylene terephthalate, a vinylidene chloride copolymer, a polyvinyl chloride polymer, a vinyl chloride copolymer, a polyamide polymer or a polyamide copolymer, or combinations of these materials.

The heat-sealable outer and inner polymer layers may consist of a low density polyethylene polymer, a linear low density polyethylene polymer, a medium density polyethylene polymer and/or blends thereof. The heat-sealable polymer materials contemplated for this invention all possess FDA approval for food contact applications and all have the ability to heat-seal on conventional equipment at conventional heat-seal temperatures (250° F. to 500° F.).

The preferred embodiments of the present invention utilize an aluminum foil layer as the primary absolute oxygen and flavor oil barrier material. All of the above-identified materials could be utilized in all alternate embodiments in place of the foil layer as well as in the preferred embodiment of the invention. The barrier and high strength layers may be applied as film laminations and/or as extrusion coatings.

The invention may be used in materials for all types of blank fed or web fed package forming equipment. The effectiveness of the laminate of the present invention as an oxygen impermeable package structure permits a significant extension of shelf-life of the products packaged in the containers.

The tough, high strength, abuse-resistant type materials can be selected from the following group of polymers: polyamide type polymers such as the preferred Nylon 6, or Nylon 6/66, Nylon 6/12, Nylon 6/9, Nylon 6/10, Nylon 11, Nylon 12; polyethylene terephthalate; polybutylene terephthalate; and ethylene vinyl alcohol copolymers; or other similar tough, high strength polymeric materials which have tensile strengths of 10,000 psi or greater at conventional heat-seal temperatures (250° F. to 500° F.).

In addition, the high strength, low viscosity caulking resins preferred are selected from the following group of polymers: ionomer type resins, such as the preferred zinc or sodium salts of ethylene methacrylic acid (Surlyn ®1652 or the like); ethylene acrylic acid copolymers; ethylene methacrylic acid copolymers; ethylene vinyl acetate copolymers; ethylene methylacrylate copolymers, ethylene based graft copolymers; and the like, all exhibiting melt flow indexes ranging from 4.5 to 14.0.

Adhesive tie layers preferred are selected from the following: Plexars ® from Quantum Chemical Co., more commonly known in the industry as ethylene based graft copolymers; CXA's ® from Dupont, more commonly known in the industry as modified polyethylene resin containing vinyl acetate, acrylate and methacrylate comonomers; Admer's ® from Mitsui, more commonly known in the industry as polyethylene copolymer based materials with grafted functional groups, and similar performing tie resins.

Additional abuse-resistant polymers, caulking polymer resins, mechanically stable structural substrates, oxygen barrier materials, and adhesive tie layers which meet the specifications and requirements outlined above could also be utilized to practice the present invention.

This invention provides a means of transforming the economical, high volume, gable top or flat top paperboard or non-paperboard food/non-food carton into an oxygen impermeable, leak free package that can be produced, sold, and filled economically at high production speeds, offering a low-cost hermetic packaging alternative to glass and metal, with the bulk of one embodiment of the package being biodegradable paperboard from a renewable resource.

The novel container has the feature of acting as a stand alone abuse-resistant package for products which when contained in normal packaging are considered to be extremely difficult to contain. Such products include: detergents, synthetic sweeteners, oil products, etc. all of which can be stored in the novel structure embodied by the invention.

What is claimed is:

1. An oxygen barrier laminate structure for producing an oxygen impermeable leak free container comprising:
   (a) a mechanically stable structural substrate having an inner and an outer surface;
   (b) an outer layer of a heat-sealable polymer material coated on the outer surface of said mechanically stable structural substrate;

(c) a first inner sandwich layer of: a first adhesive tie layer, an oxygen barrier material layer, a second adhesive tie layer, all coated in the sequence listed on the inner surface of said mechanically stable structural substrate;

(d) a second inner sandwich layer of: a first caulking polymer resin layer, an abuse-resistant polymer resin layer, a second caulking polymer resin layer, all coated in the sequence listed on the inner surface of the second adhesive tie layer of the first inner sandwich layer, and;

(e) an inner heat-sealable product contact polymer material layer of low density polyethylene polymer extrusion coated on said inner surface of said second caulking polymer resin layer of said second inner sandwich layer, which is heat-sealable with the outer layer of polymer material on conventional equipment at temperatures ranging from 250° F. to 500° F. and wherein said first and second caulking polymer resins are selected from the group consisting of zinc salts of ethylene methacrylic acid copolymers, sodium salts of ethylene methacrylic acid copolymers, ethylene acrylic acid copolymers, ethylene methacrylic acid copolymers, ethylene vinyl acetate copolymers, ethylene methacrylate copolymers, and ethylene based graft copolymers.

2. An oxygen barrier laminate structure for producing an oxygen impermeable leak free container, said laminate as claimed in claim 1, wherein said mechanically stable structural substrate is selected from the group consisting of bleached paperboard, unbleached paperboard, corrugated board, high density polyethylene, high density polypropylene and multi-ply combinations thereof.

3. An oxygen barrier laminate structure for producing an oxygen impermeable leak free container, said laminate as claimed in claim 1, wherein said oxygen barrier material layer is selected from the group consisting of aluminum foil, ethylene vinyl alcohol copolymer, polyvinyl alcohol, polyethylene terephthalate, glycol-modified polyethylene terephthalate, acid-modified polyethylene terephthalate, polybutylene terephthalate, vinylidene chloride copolymer, polyvinyl chloride polymer, vinyl chloride copolymer, polyamide polymer and polyamide copolymer.

4. An oxygen barrier laminate structure for producing an oxygen impermeable leak free container, said laminate as claimed in claim 1, wherein said abuse-resistant polymer resin exhibits a tensile strength of 10,000 psi or greater.

5. An oxygen barrier laminate structure for producing an oxygen impermeable leak free container, said laminate as claimed in claim 4, wherein said abuse-resistant polymer is selected from the group consisting of polyamide polymers, polyethylene terephthalate, polybutylene terephthalate and ethylene vinyl alcohol copolymer.

6. An oxygen barrier laminate structure for producing an oxygen impermeable leak free container, said laminate as claimed in claim 1, wherein said first and second adhesive tie layers are selected from the group consisting of ethylene based copolymers with grafted functional groups, modified polyethylene resin containing vinyl acetate, acrylate and methacrylate comonomers, and polyethylene copolymer based materials with grafted functional groups.

7. An oxygen barrier laminate structure for producing an oxygen impermeable leak free container, said laminate as claimed in claim 1, wherein said first and second caulking polymer resins exhibit a melt flow index ranging from 4.5 to 14.0.

8. An oxygen barrier laminate structure for producing an oxygen impermeable leak free container, said laminate as claimed in claim 1, wherein said mechanically stable structural substrate is paperboard, said oxygen barrier material layer is aluminum foil, said abuse-resistant polymer resin is a polyamide polymer having a tensile strength greater than 10,000 psi, and wherein said first and second caulking polymer resins are a zinc salt of ethylene methacrylic acid copolymer having a melt flow index ranging from 4.5 to 14.0.

9. An oxygen barrier laminate structure for producing an oxygen impermeable leak free container, said laminate as claimed in claim 1, wherein said outer and inner heat-sealable polymer material is low density polyethylene, linear low density polyethylene, medium density polyethylene or blends thereof.

10. An oxygen impermeable side-seamed blank, said blank constructed from a laminate comprising:
(a) a mechanically stable structural substrate having an inner and an outer surface;
(b) an outer layer of a heat-sealable polymer material coated on the outer surface of said mechanically stable structural substrate;
(c) a first inner sandwich layer of: a first adhesive tie layer, an oxygen barrier material layer, a second adhesive tie layer, all coated in the sequence listed on the inner surface of said mechanically stable structural substrate;
(d) a second inner sandwich layer of: a first caulking polymer resin layer, an abuse-resistant polymer resin layer, a second caulking polymer resin layer, all coated in the sequence listed on the inner surface of the second adhesive tie layer of the first inner sandwich layer, and;
(e) an inner heat-sealable product contact polymer material layer extrusion coated on said inner surface of said second caulking polymer resin layer of said second inner sandwich layer, which is heat-sealable with the outer layer of polymer material on conventional equipment at temperatures ranging from 250° F. to 500° F. and wherein said first and second caulking polymer resins are selected from the group consisting of zinc salts of ethylene methacrylic acid copolymers, sodium salts of ethylene methacrylic acid copolymers, ethylene acrylic acid copolymers, ethylene methacrylic acid copolymers, ethylene vinyl acetate copolymers, ethylene methacrylate copolymers and ethylene based graft copolymers.

11. An oxygen impermeable side-seamed blank as claimed in claim 10, wherein said mechanically stable structural substrate is selected from the group consisting of bleached paperboard, unbleached paperboard, corrugated board, high density polyethylene, high density polypropylene and multi-ply combinations thereof.

12. An oxygen impermeable side-seamed blank as claimed in claim 10, wherein said oxygen barrier material layer is selected from the group consisting of aluminum foil, ethylene vinyl alcohol copolymer, polyvinyl alcohol, polyethylene terephthalate, glycol-modified polyethylene terephthalate, acid-modified polyethylene terephthalate, polyethylene terephthalate, vinylidene chloride copolymer, polyvinyl chloride polymer, vinyl chloride copolymer, polyamide polymer and polyamide copolymer.

13. An oxygen impermeable side-seamed blank as claimed in claim 10, wherein said abuse-resistant polymer resin exhibits a tensile strength of 10,000 psi or greater.

14. An oxygen impermeable side-seamed blank as claimed in claim 13, wherein said abuse-resistant polymer is selected from the group consisting of polyamide polymers, polyethylene terephthalate, polybutylene terephthalate and ethylene vinyl alcohol copolymer.

15. An oxygen impermeable side-seamed blank as claimed in claim 10, wherein said first and second adhesive tie layer are selected from the group consisting of ethylene based copolymers with grafted functional groups, modified polyethylene resin containing vinyl acetate, acrylate and methacrylate comonomers and polyethylene copolymer based materials with grafted functional groups.

16. An oxygen impermeable side-seamed blank as claimed in claim 10, wherein said first and second caulking polymer resins exhibit a melt flow index ranging from 4.5 to 14.0.

17. An oxygen impermeable side-seamed blank as claimed in claim 10, wherein said mechanically stable structural substrate is paperboard, said oxygen barrier material layer is aluminum foil, said abuse-resistant polymer resin is a polyamide polymer having a tensile strength greater than 10,000 psi, and wherein said first and second caulking polymer resins are a zinc salt of ethylene methacrylic acid copolymer having a melt flow index ranging from 4.5 to 14.0.

18. An oxygen impermeable side-seamed blank as claimed in claim 10, wherein said outer and inner heat-sealable polymer material is low density polyethylene, linear low density polyethylene, medium density polyethylene or blends thereof.

19. An oxygen impermeable leak free container, said container constructed from a laminate comprising:
  (a) a mechanically stable structural substrate having an inner and an outer surface;
  (b) an outer layer of a heat-sealable polymer material coated on the outer surface of said mechanically stable structural substrate;
  (c) a first inner layer of caulking polymer resin coated on the inner surface of said mechanically stable structural substrate;
  (d) a second inner sandwich layer of: a first caulking polymer resin layer, an abuse-resistant polymer resin layer, a second caulking polymer resin layer, all coated in the sequence listed on the inner surface of the second adhesive tie layer of the first inner sandwich layer, and;
  (e) an inner heat-sealable product contact layer polymer material extrusion coated on said inner surface of said second caulking polymer resin layer of said second inner sandwich layer, which is heat-sealable with the outer layer of low density polyethylene polymer on conventional equipment at temperatures ranging from 250° F. to 500° F. and wherein said first and second caulking polymer resins are selected from the group consisting of zinc salts of ethylene methacrylic acid copolymers, sodium salts of ethylene methacrylic acid copolymers, ethylene acrylic acid copolymers, ethylene methacrylic acid copolymers, ethylene vinyl acetate copolymers, ethylene methacrylate copolymers and ethylene based graft copolymers.

20. An oxygen impermeable leak free container, as claimed in claim 19, wherein said mechanically stable structural substrate is selected from the group consisting of bleached paperboard, unbleached paperboard, corrugated board, high density polyethylene, high density polypropylene and multi-ply combinations thereof.

21. An oxygen impermeable leak free container, as claimed in claim 19, wherein said oxygen barrier material layer is selected from the group consisting of aluminum foil, ethylene vinyl alcohol copolymer, polyvinyl alcohol, polyethylene terephthalate, glycol-modified polyethylene terephthalate, acid-modified polyethylene terephthalate, polybutylene terephthalate, vinylidene chloride copolymer, polyvinyl chloride polymer, vinyl chloride copolymer, polyamide polymer and polyamide copolymer.

22. An oxygen impermeable leak free container, as claimed in claim 19, wherein said abuse-resistant polymer resin exhibits a tensile strength of 10,000 psi or greater.

23. An oxygen impermeable leak free container, as claimed in claim 22, wherein said abuse-resistant polymer is selected from the group consisting of polyamide polymers, polyethylene terephthalate, polybutylene terephthalate, and ethylene vinyl alcohol copolymer.

24. An oxygen impermeable leak free container, as claimed in claim 19, wherein said first and second adhesive tie layers are selected from the group consisting of ethylene based copolymers with grafted functional groups, modified polyethylene resin containing vinyl acetate, acrylate and methacrylate monomers and polyethylene copolymer based materials with grafted functional groups.

25. An oxygen impermeable leak free container, as claimed in claim 19, wherein said first and second caulking polymer resins exhibit a melt flow index ranging from 4.5 to 14.0.

26. An oxygen impermeable leak free container, as claimed in claim 19, wherein said mechanically stable structural substrate is paperboard, said oxygen barrier material layer is aluminum foil, said abuse-resistant polymer resin is a polyamide polymer having a tensile strength greater than 10,000 psi, and wherein said first and second caulking polymer resins are a zinc salt of ethylene methacrylic acid copolymer having a melt flow index ranging from 4.5 to 14.0.

27. An oxygen impermeable leak free container, as claimed in claim 19, wherein said outer and inner heat-sealable polymer material is low density polyethylene, linear low density polyethylene, medium density polyethylene or blends thereof.

* * * * *